(12) United States Patent
Alek

(10) Patent No.: US 9,620,280 B2
(45) Date of Patent: Apr. 11, 2017

(54) ENERGY MANAGEMENT SYSTEM

(71) Applicant: William Alek, Phoenix, AZ (US)

(72) Inventor: William Alek, Phoenix, AZ (US)

(73) Assignee: William Alek, Scottsdale, AZ (US)

( * ) Notice: Subject to any disclaimer, the term of this patent is extended or adjusted under 35 U.S.C. 154(b) by 147 days.

(21) Appl. No.: 14/590,691

(22) Filed: Jan. 6, 2015

(65) Prior Publication Data

US 2015/0194255 A1    Jul. 9, 2015

Related U.S. Application Data

(60) Provisional application No. 61/924,139, filed on Jan. 6, 2014, provisional application No. 61/981,417, filed on Apr. 18, 2014.

(51) Int. Cl.
| | |
|---|---|
| H01F 27/24 | (2006.01) |
| H01F 27/28 | (2006.01) |
| H01F 17/04 | (2006.01) |
| H01F 27/38 | (2006.01) |
| H01F 30/10 | (2006.01) |
| H02N 11/00 | (2006.01) |

(52) U.S. Cl.
CPC ............. *H01F 27/38* (2013.01); *H01F 30/10* (2013.01); *H02N 11/008* (2013.01)

(58) Field of Classification Search
CPC ..... H01F 27/245; H01F 30/06; H01F 27/2847
USPC ................ 336/212, 220, 221, 222, 180, 229
See application file for complete search history.

(56) References Cited

U.S. PATENT DOCUMENTS

| | | | |
|---|---|---|---|
| 512,340 A | 1/1894 | Tesla | |
| 3,553,620 A * | 1/1971 | Cielo et al. ............... | G05F 1/62 336/165 |
| 4,562,382 A | 12/1985 | Elliott | |
| 5,555,494 A * | 9/1996 | Morris .................. | H02M 3/337 363/132 |
| 5,929,738 A | 7/1999 | Orlando | |
| 6,668,444 B2 | 12/2003 | Ngo et al. | |
| 6,750,749 B2 | 6/2004 | Shirahata | |
| 7,498,920 B2 | 3/2009 | Sullivan et al. | |
| 8,373,529 B2 | 2/2013 | Hurst et al. | |
| 2011/0063065 A1 | 3/2011 | Hugues et al. | |

FOREIGN PATENT DOCUMENTS

| | | |
|---|---|---|
| CA | 2594905 A1 | 1/2009 |
| CN | 101276675 A | 10/2008 |
| CN | 101276679 A | 10/2008 |

(Continued)

OTHER PUBLICATIONS http://www.energeticforum.com/renewable-energy/10394-bi-toroid-transformer-thane-c-heins-2.html.
Magnetic Field Transformer (MFT). http://purco.qc.ca/ftp/Overunity.com%20-%20Forum%20members/grumpy/Toroidal_Transformer_Based_Power_Amplifier.pdf.

*Primary Examiner* — Tsz Chan
(74) *Attorney, Agent, or Firm* — Wayne Carroll; Inspired Idea Solutions Law Firm

(57) ABSTRACT

A split-flux transformer has a primary or input coil, at least two secondary or output coils, spaced apart and arranged in 3D, a magnetic core running through the primary and secondary coils, a source of electricity connected to the primary coil which when turned on creates a magnetic field in the core, and electrical wires connected to the secondary coils, each of which provides additive electricity into an output circuit.

16 Claims, 5 Drawing Sheets

(56) References Cited

FOREIGN PATENT DOCUMENTS

| | | |
|---|---|---|
| CN | 201259817 Y | 6/2009 |
| CN | 102226974 B | 10/2011 |
| CN | 202549575 U | 11/2012 |
| CN | 202771917 U | 3/2013 |
| GB | 216254 A | 5/1924 |
| GB | 742494 A | 12/1955 |
| GB | 2029118 B | 3/1980 |
| WO | 2012163036 A1 | 12/2012 |
| WO | 2013107480 A1 | 7/2013 |

* cited by examiner

ENERGY MANAGEMENT SYSTEM

RELATED APPLICATIONS

This application claims the benefit of pending U.S. Ser. No. 61/981,417 filed Apr. 18, 2014, and the benefit of pending U.S. Ser. No. 61/924,139, filed Jan. 6, 2014, both of which are hereby incorporated by reference.

TECHNICAL FIELD

The present invention relates to an energy management system employing an improved split-flux transformer designed for greater energy production

BACKGROUND

Traditional transformers have been in use for over 100 years. They are used broadly in electronic and electrical power applications, where they are essential for the transmission, distribution and utilization of electricity. They are used to transform input power, typically accessible power at 120V AC, to a higher or lower voltage output appropriate for the use. Transformer physics shows that only input real power can be transformed to output real power with an overall efficiency of less than 100%. One type of power loss is eddy current losses (minimized by insulation). Transformers transfer energy by inductive coupling between its wound coils and circuits. One coil is the primary coil, while others are referred to as secondary. Basically a varying current passing through the primary coil creates a magnetic flux in the transformer's core which in turn produces a magnetic flux through the secondary coils. The magnetic flux in the secondary coils induces a varying and usually different electromotive force or voltage.

SUMMARY OF THE INVENTION

In one embodiment, there is provided a split-flux transformer with a primary or input coil, at least two secondary or output coils, spaced apart and arranged in 3D, a magnetic core running through the primary and secondary coils, a source of electricity connected to the primary coil which when turned on creates a magnetic field in the core, and electrical wires connected to the secondary coils, each of which provides additive electricity into an output circuit.

BRIEF DESCRIPTION OF THE DRAWINGS

For a further understanding of the objects and advantages of the present invention, reference should be had to the following detailed description, taken in conjunction with the accompanying drawing, in which like parts are given like reference numbers and wherein.

DETAILED DESCRIPTION OF THE PREFERRED EMBODIMENTS

The disclosed energy management system (EMS) is based on an improved transformer configuration referred to as a split-flux transformer. The new disclosed arrangements may allow the use of greatly reduced input real power to the primary coil, resulting in a significant improvement in efficiency, by redirecting the opposing magnetomotive force ($mmf_{SECn}$) produced by the secondary coils away from the primary coil magnetomotive force ($mmf_{PRI}$) through an alternate flux path.

This new design can be used in a plethora of devices that currently use battery power resulting in a significant improvement in efficiency. These devices can include but are not limited to, electric bikes, scooters, wheelchairs, autos, homes, and cell phone towers.

Figure 1:
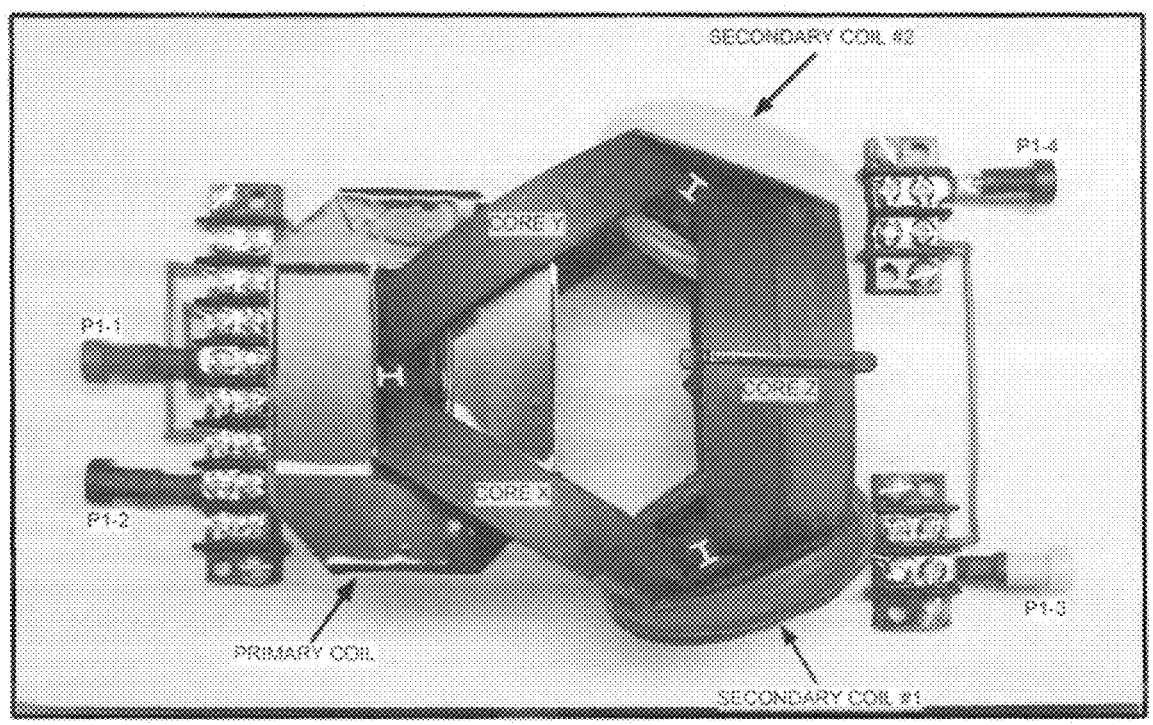
FIG. 1 displays an earlier split-flux transformer prototype.

The basic system is shown in FIG. 1, an early split-flux transformer (SFT) prototype. Not wishing to be bound by a particular theory, it appears that my new transformer design redirects the input magnetomotive forces produced by the primary coil flux in two ferromagnetic cores from the opposing magnetomotive forces produced by the secondary coils. This allows almost all of electric energy supplied to the primary coil to be returned back to the source. Thus, the primary coil electric energy is almost entirely reactive. The primary coil flux is split equally in two with each half inducing an output voltage in the secondary set of coils. The secondary output voltages are determined by the ratio of turns between the primary input coil and the secondary output coils. The secondary set of coils has a common third core, which has a cross-sectional area much greater than the first two cores. This configuration allows the opposing magnetomotive forces produced by the secondary coils to be almost entirely redirected from the input magnetomotive forces produced by the primary coil flux. The secondary output coils have a bifilar-like coil arrangement that greatly reduce the output impedance.

The following table shows a summary computation:

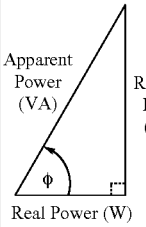

Compute Real Power PAVG (Watts) below,

Real Power = $P_{AVG}$ = (Apparent Power) (Power Factor)

Where,

Apparent Power = S = $V_{RMS} I_{RMS}$

Power Factor = cos (φ)

So, $P_{AVG} = V_{RMS} I_{RMS} \cos(\phi)$

Since the power in the primary is almost entirely reactive, or φ → 90°, $\lim_{\phi \to 90°} P_{AVG(\phi)} = \lim_{\phi \to 90°} V_{RMS} I_{RMS} \cos(\phi) = 0$ Watts Therefore, Real Power ($P_{AVG}$) → 0 Watts.

Figure 2:
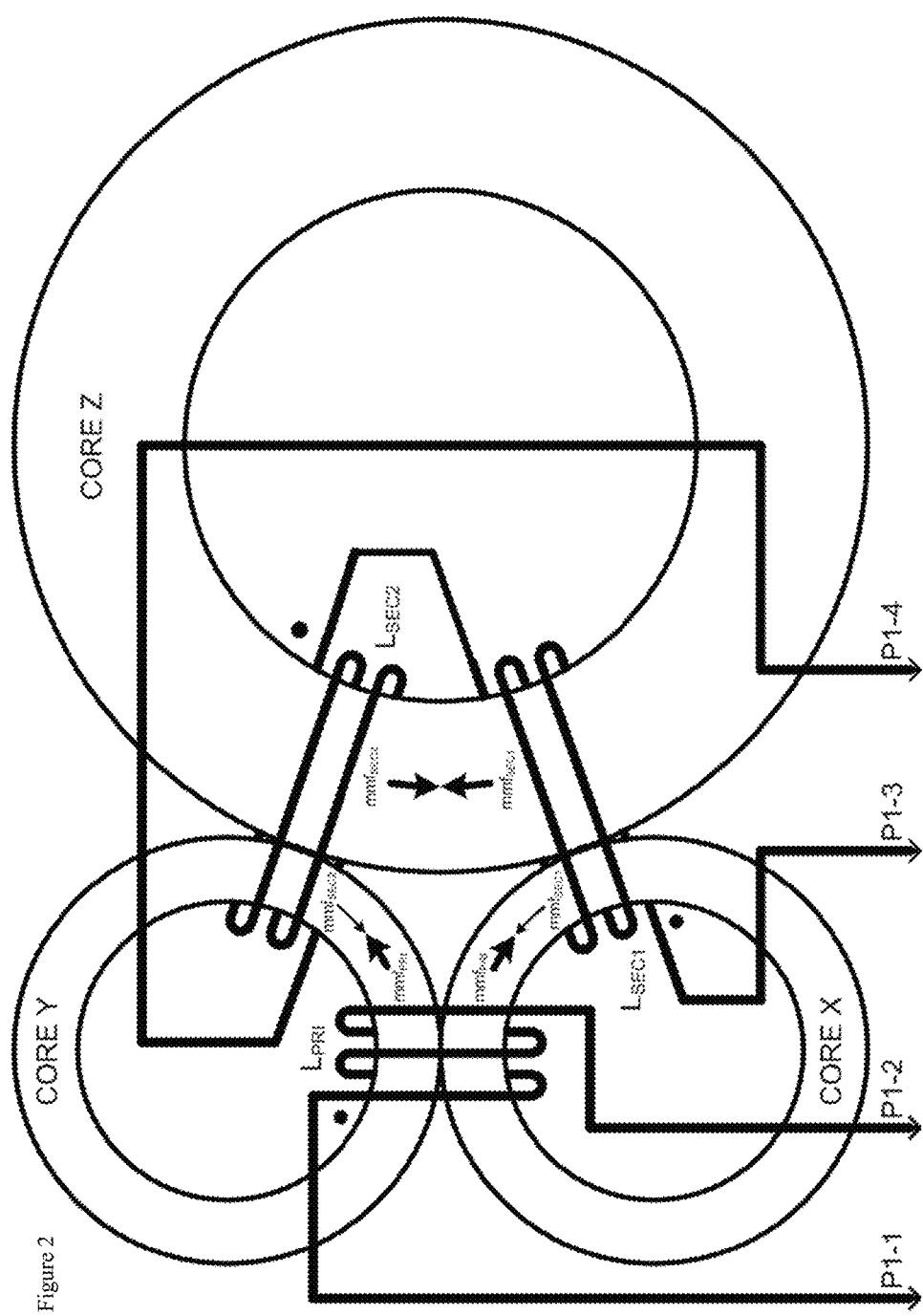
FIG. 2 is a schematic of the split-flux transformer showing the location of the primary and secondary coils and the cores.

The above diagram shows how input real power ($P_{avg}$) is calculated. The input current ($I_{RMS}$) phase angle (φ) always lags the voltage ($V_{RMS}$) by slightly less than 90°. This is due to resistive losses in the primary coil and a small opposing magnetomotive force ($mmf_{SECn}$) caused by the secondary coil. Almost all of the opposing magnetomotive force produced by the secondary coils is directed away from the primary coil (FIG. 2). This results in a very low amount of input real power delivered to the primary coil.

The follow equations were used to develop a computer model of the split-flux transformer:

1. The magnetomotive force mmf (ampere-turns): mmf=$\Phi R_m$ where $\Phi$ is the magnetic flux in the core; and $R_m$ is the reluctance of the core, ampere turns, weber.

2. The magnetomotive force mmf (ampere-turns), mmf=I N, where I is the current in amperes; and N is the number of turns of wire around the core.

3. The magnetomotive force mmf (ampere-turns), mmf=H $l_e$, where H is the magnetic field intensity (Ampere-turns/meter); and $l_e$ is the effective length of the magnetic circuit in meters.

4. The reluctance Rm (ampere-turns/weber) of the core, $R_m = (l_e / \mu_0 \mu_r A_e) = l_e / \mu A_e$ where, $l_e$ is the effective length of the magnetic circuit in meters; $\mu_0$ is the permeability of vacuum, or $4\pi \times 10^{-7}$ weber/ampere-turn-meter; $\mu_r$ is the relative magnetic permeability of the core material (dimension-less); $A_e$ is the cross-sectional effective area of the magnetic circuit I square meters; $\mu$ is the absolute magnetic permeability (such as $\mu_0 \mu_r$).

5. The magnetic flux density B (weber/m$^2$) is valid up to saturation of the core, such that B=$\mu$ H=$\mu_0 \mu_r$ H, where $\mu$ is the absolute magnetic permeability, $\mu_0$–$\mu_r$ (weber/ampere-turn-m); H is the magnetic field intensity or magnetizing force (ampere-turns/m); $\mu_0$ is the permeability of the vacuum or $4\pi \times 10^{-7}$ weber/ampere-turn-m; $\mu_r$ is the relative magnetic permeability of the core material (dimension-less).

6. The total flux $\Phi$ (webers) is calculated as $\Phi = B \times A_e = I L/N$, where B is the magnetic flux density (weber/m$^2$), $A_e$ is the cross-sectional effective area of the magnetic circuit in m$^2$; I is the current (amperes); L is the inductance of the coil (henry); and N is the number of turns of wire around the core.

7. The inductance of the coil is calculated with L=$A_1 N_2 \times 10^{-9}$, where L is the inductance of the coil (nanohenry/turn$^2$); $A_1$ is the inductance factor given by core manufacturer (nanohenry/turn$^2$); N is the number of turns or wire around the core.

8. The inductance factor of the core is calculated as $A_1 = 10^{-9}/R_m$, where $R_m$ is the reluctance of the core (ampere-turns/weber).

9. The core factor is calculated as follows: $\Sigma IA = l_e / A_e$, where $\Sigma IA$ is the core factor (meter$^{-1}$), $l_e$ is the effective length of the magnetic circuit (m); $A_e$ is the cross-sectional effective area of the magnetic circuit (m$^2$).

10. The induced voltage emf (v) across a coil is calculated as emf=N d$\Phi$/dt, where N is the number of turns of wire around the core; and d$\Phi$/dt is the changing flux over time.

Figure 4:
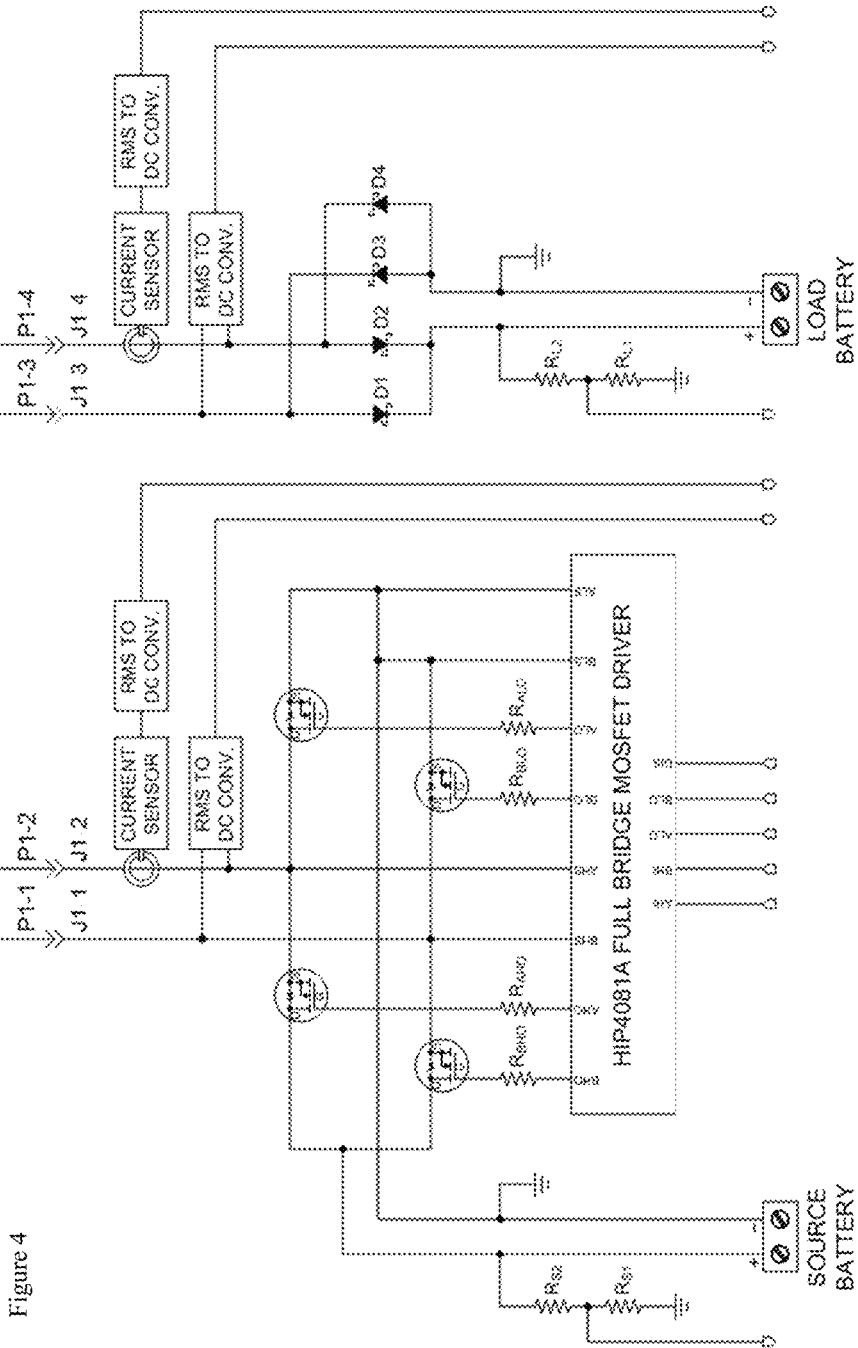
FIG. 4 is a schematic of the transformer charging power circuitry.

This energy management system is specially designed to measure, collect and store excess energy produced by the split-flux transformer in energy reservoirs such as batteries or ultra-capacitors. As shown in FIG. 4, the system is controlled preferably by a programmed chip (in particular dsPIC30F6011A, 16-bit microcontroller) to measure input/output voltages and currents, calculate coefficient of performance (COP) or efficiency, and contains special software algorithms for a complete "turn-key" system that can operate 24 hours a day with little or no maintenance. The microcontroller operates an H-bridge driver that simulates an AC sine wave using a pulse width modulated waveform. This waveform drives the primary input coil. The secondary output coils of the transformer are wired in series and connected to a full-wave bridge rectifier. In one embodiment, the rectified DC output is connected to and charges an energy reservoir.

When the energy management system is provided with appliances with batteries, the EMS keeps the batteries fully charged; no other input power source is required. The EMS maintains proper battery recharging power through a special self-charging process. The EMS is equipped with a circuit board that operates by receiving power from a rechargeable battery. The microcontroller located on the circuit board and driven by a software program operates an H-bridge driver circuit that transforms direct current (DC) from the battery to alternating current (AC) and delivers the AC current to the circuit board's input primary coil. The output current of the EMS is rectified on the circuit board using a full-wave bridge rectifier. The output current from the rectifier is delivered back to the rechargeable battery.

All currents and voltages coming from and delivered to the rechargeable battery pack were monitored by the optional microcontroller using special interface circuits located on the circuit board. The microcontroller software program uses this information to determine the optimal charging rates and maximum charging voltage by controlling the pulse-width modulation (PWM) of the H-bridge driver.

In addition, all currents and voltages coming from and delivered to the split-flux transformer are monitored by the microcontroller using special interface circuits located on the circuit board. The microcontroller software program uses this information to determine the overall efficiency of the split-flux transformer.

The microcontroller communicates to an operator using a human-interface device equipped with a keyboard and alphanumeric display.

In addition, the microcontroller also communicates with a laptop computer for data-logging purposes. It should be understood that the circuits used to determine the overall efficiency, for the human interface and to perform data logging were useful to test my invention but are not essential in most inventive uses.

In operation, the system causes the split-flux transformer (SFT) to function as a pumped phase conjugate mirror (PPCM), which transforms conjugated electromagnetic (EM) energy to real EM energy. Very high transformer efficiencies have been realized with this technology.

The PPCM occurs by splitting the flux equally between the two transformer cores. The two cores include secondary output coils wrapped around each core and wired in such a way that the resulting magnetomotive forces oppose one another. This is a special bifilar output coil configuration, which has a benefit of greatly lowering the output impedance of the coils. The output coils may be wired in series or in parallel In addition to lowering the output impedance of the coils, little power is reflected back to the primary due to the mutual coupling of the coils. Therefore, power delivered to the primary coil is highly conserved and not wasted on impedance.

Nuclear non-recoil action emits both real EM wave and its phase-conjugated replica EM wave. While the real EM wave is a time-forward wave, its phase-conjugated replica wave is time-reversed. The phase-conjugated time-reversed wave is present everywhere in the universe as negative energy and is utilized and transformed by the PPCM as real EM energy.

Example 1

Ideal Split-Flux Transformer

Figure 3:
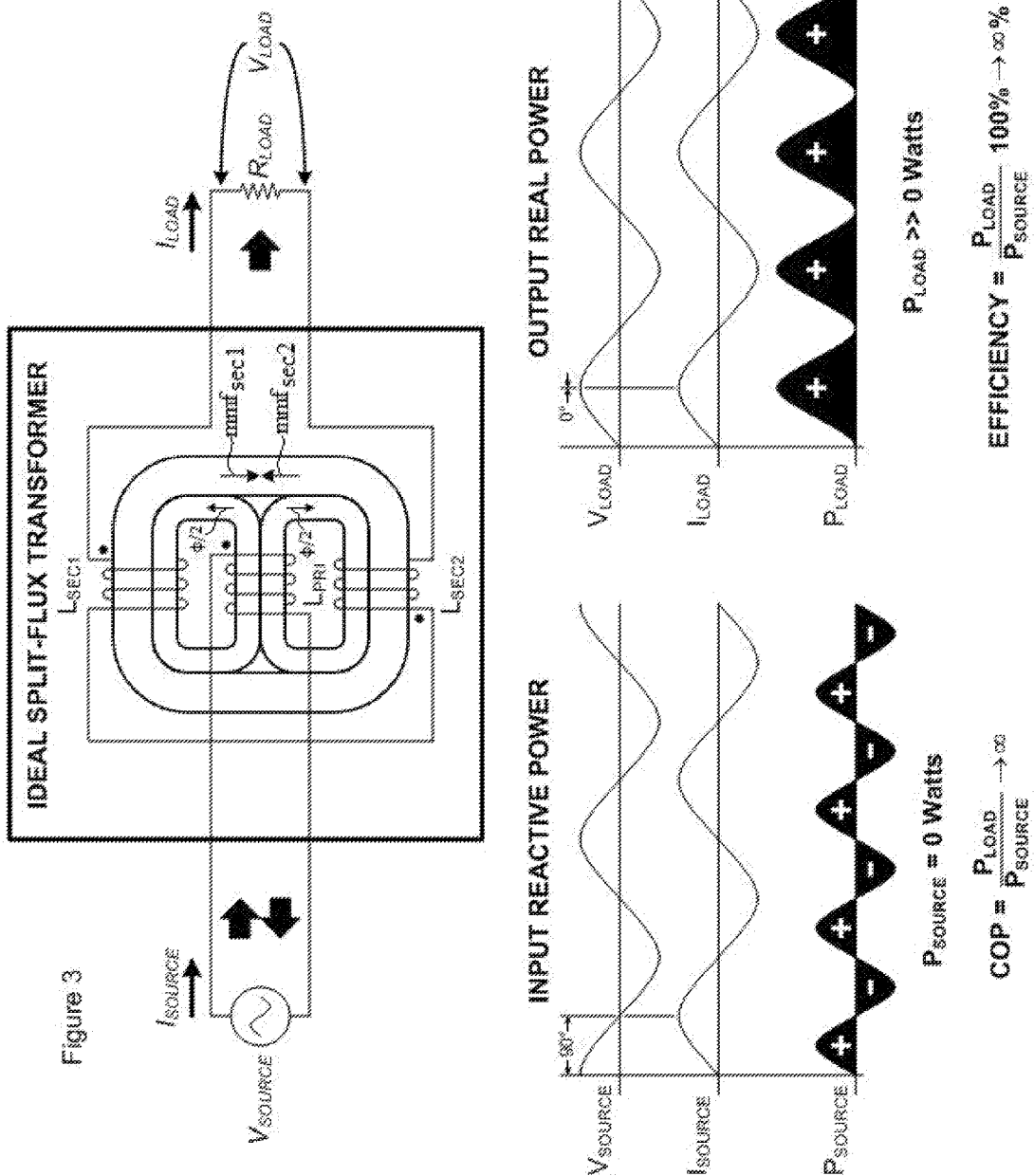
FIG. 3 is a schematic of the "ideal" split-flux transformer showing a different configuration of the cores, input and output power, as well as graphs and results.

FIG. 3 is a schematic of the ideal split-flux transformer with the primary coil wound around two separate, but equal cores. This effectively splits the flux in half for each core.

Because the primary coil is assumed to be ideal, all the power delivered to the coil is sent back to the source. Hence, no total power ($P_{source}$) is consumed on the primary side and the coil is considered to be completely reactive. On the secondary side, the two identical coils are wound around a single core, and they behave like a single bifilar-like coil. The magnetic flux produced from the primary side is physically isolated from the secondary side. However, the primary flux produces an opposing magnetomotive force in the secondary core from the secondary coils, which is only present in the secondary core due to its much lower reluctance. The opposing secondary magnetomotive forces are essentially decoupled from the primary flux. Because the secondary coils are wound in a bifilar-like configuration, the opposing magnetomotive forces are directed towards each other causing real power to be delivered to the load. This means the load voltage and load current are perfectly in-phase with each other and the real power ($P_{LOAD}$) is always finite. The Coefficient of Performance (COP) and the overall efficiency of the Ideal Split-Flux transformer can now be determined:

Since $P_{SOURCE} \rightarrow 0$ Watts $COP = P_{LOAD}/P_{SOURCE} = P_{LOAD}/0 \rightarrow \infty$ Efficiency $= P_{LOAD}/P_{SOURCE} \times 100\% \rightarrow \infty$ If the split-flux transformer were indeed ideal, its efficiency would approach infinity.

Example 2

A Practical Split-Flux Transformer

FIG. 1 shows my earlier experimental split-flux transformer that I tested with results shown below. This transformer decoupled the input ferromagnetic core flux from the opposing core magnetomotive forces produced by bifilar-like output coils. Therefore, almost all of the energy supplied to the system was returned back to the source due to the reactive action of the system. This particular arrangement of the dual secondary coils allowed both coils to generate electricity without interfering with the highly efficient primary coil. I controlled the system with a Microchip dsPIC30F6011A, 16-bit microcontroller that was programmed to measure input and output voltages and currents, as well as to calculate COP. This microcontroller also contained special software algorithms for a complete "turn-key" energy management system that can operate 24 hours a day. The system featured a user interface, which allowed the development of a wide range of applications that use a standard hardware/software platform framework (FIG. 4). I used a dual trace scope to measure the phase angle between the voltage and the current. In one embodiment, all coils used 22 AWG (American wire gage) copper magnet wire. Core material was permalloy #50031-1D from Magnetics, Inc. The abbreviations used in the following tables were defined above and also appear in the figures.

| Primary Coil | Secondary Coil #1 | Secondary Coil #2 |
|---|---|---|
| $L_{PRI}$ = 1.69 H | $L_{SEC1}$ = 589 mH | $L_{SEC2}$ = 584 mH |
| $Q_{PRI}$ = 24.4 | $Q_{SEC1}$ = 9.7 | $Q_{SEC2}$ = 9.6 |
| $Z_{PRI(@1\ KHz)}$ = 445 Ω | $Z_{SEC1(@1\ KHz)}$ = 390 Ω | $Z_{SEC2(@1\ KHz)}$ = 392 Ω |
| $N_{PRI}$ = 500 turns | $N_{SEC1}$ = 180 turns | $N_{SEC2}$ = 180 turns |
| $R_{PRI}$ = 3.7 Ω | $R_{SEC1}$ = 1.1 Ω | $R_{SEC2}$ = 1.2 Ω |

| Primary Side Readings | Secondary Side Readings |
|---|---|
| $V_{Source}$ = 11.04 $V_{RMS}$ | $V_{LOAD}$ = 1.572 $V_{RMS}$ |
| $I_{SOURCE}$ = 0.0158 $A_{RMS}$ | $I_{LOAD}$ = 0.0317 $A_{RMS}$ |
| $\Phi$ = 77° | $R_{LOAD}$ = 49.5 Ω |

| Results |
|---|
| $P_{LOAD} = V_{LOAD} I_{LOAD} \cos(0°) = 0.0499$ Watts |
| $P_{SOURCE} = V_{SOURCE} I_{SOURCE} \cos(77°) = 0.0392$ Watts |
| $COP = P_{LOAD}/P_{SOURCE} = 1.273$ |

These results indicated that the inventive energy management system produced more energy than it consumed so that it can be attached to rechargeable batteries which are thereby constantly recharged. This system can avoid the down-time that many rechargeable battery powered device experience.

Figures 5A, 5B:
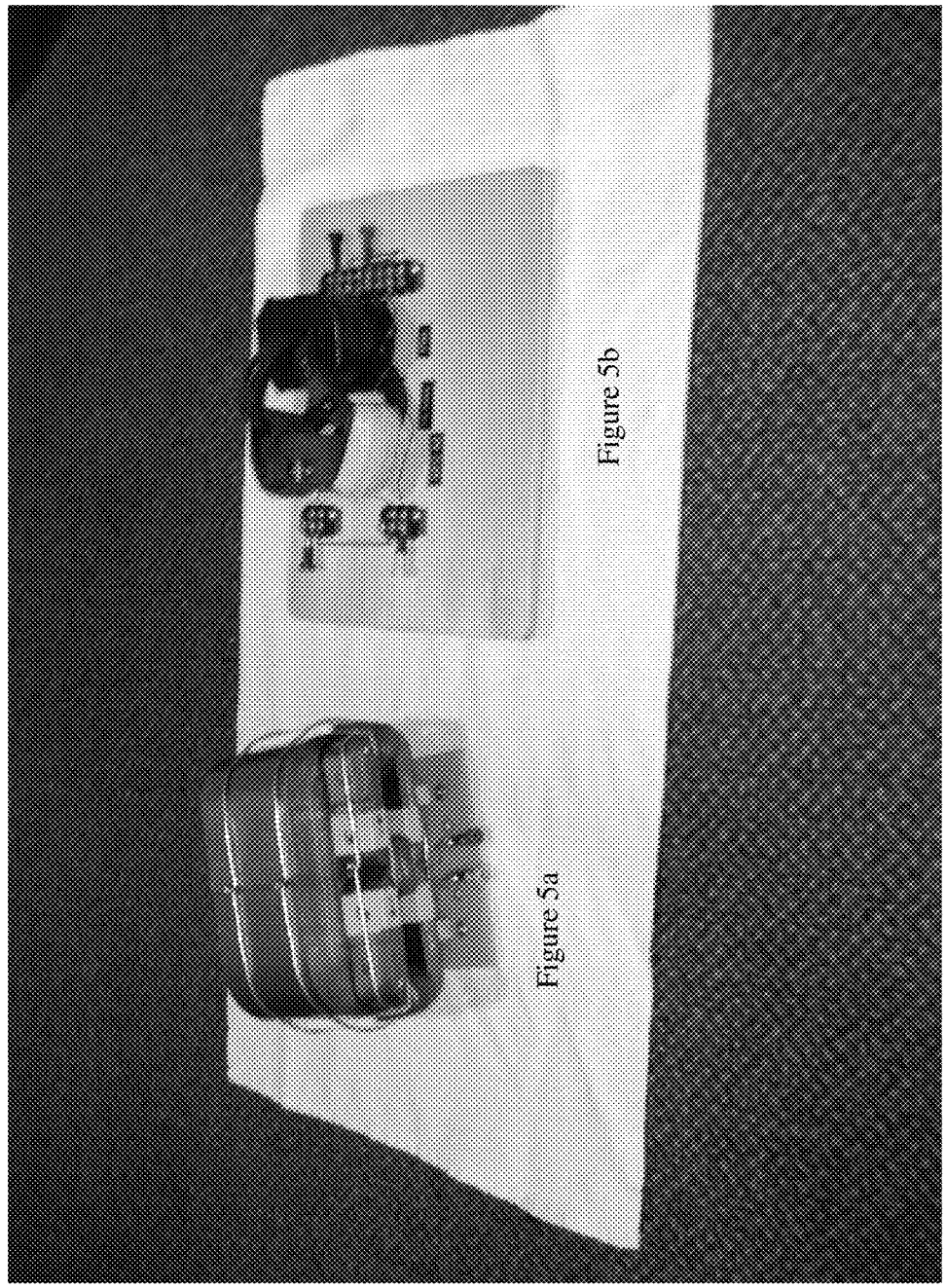
FIGS. 5a and 5b show a configuration (FIG. 5a) of the split-flux transformer similar to that shown in FIG. 3 and an additional model (FIG. 5b) wherein there are three separate cores, similar to FIG. 2.

Two additional prototypes are shown in FIGS. 5a and 5b. These prototypes though of different designs utilized Metglas brand amorphous alloy metal cores. Although there are many known materials for the cores, a preferred material for the cores is an amorphous glass metal alloy that can be magnetized and demagnetized quickly and effectively.

As can be seen from the foregoing examples, it is possible to connect the various components in a variety of ways that still represent the invention. Furthermore, as can be seen from the foregoing examples, some of the components can be omitted or routed around.

For the purposes of promoting an understanding of the principles of the invention, reference will now be made to the exemplary embodiments illustrated in the drawings, and specific language will be used to describe the same. It will nevertheless be understood that no limitation of the scope of the invention is hereby intended. Any alterations and further modifications of the inventive features illustrated herein, and any additional application of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus appearances of the phrases an "embodiment," and "example, " and similar language throughout this specification may, but do not necessarily, all refer to the same embodiment, to different embodiments, or to one or more of the figures. Additional, reference to the words "embodiment", "example" or the like for two or more features, elements, etc., does not mean that the features are necessarily related, dissimilar, the same, etc.

Each statement of an embodiment or example is to be considered independent of any other statement of an embodiment despite any use of similar or identical language characterizing each embodiment. Therefore, where an embodiment is identified as "another embodiment," the identified embodiment is independent of any other embodiments characterized by the language "another embodiment." The features, functions and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional un-recited elements or method steps. "Comprising" is to be interpreted broadly and including the more restrictive terms "consisting of" and "consisting essentially of."

Reference throughout this specification to features, advantages, or similar language does not imply that all of features and advantages that may be realized with the present invention should be or are in any single embodiment of the invention. Rather, language referring to the features and advantages is understood to mean that a specific feature, advantage or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The invention claimed is:

1. A split flux transformer comprising
   a. an input coil;
   b. a first output coil, and a second output coil spaced apart;
   c. a first magnetic core running through the input coil and the first output coil; and a second magnetic core running through the input coil and the second output coil; and a third magnetic core that is common to the first output coil and the second output coil;
   d. a source of electricity connected to the input coil which when turned on creates a first magnetic flux in the first magnetic core producing a first flow of current in the first output coil which induces a first magnetomotive force in the third magnetic core, wherein the source of electricity creates a second magnetic flux in the second magnetic core producing a second flow of current in the second output coil which induces a second magnetomotive force in the third magnetic core, and wherein the first magnetomotive force is opposed to the second magnetomotive force; and
   e. electrical wires connected to the first and second output coils to deliver electrical energy to an output circuit.

2. The split flux transformer of claim 1 wherein the first output coil and the second output coil are serially connected.

3. The split flux transformer of claim 1 wherein the first output coil and the second output coil are connected in parallel.

4. The split flux transformer of claim 1 wherein the first magnetic core has a first cross-sectional area, and the second magnetic core has a second cross-sectional area that is substantially the same as the first cross-sectional area; and wherein the third magnetic core has a cross-sectional area that is greater than the first cross-sectional area.

5. The split flux transformer of claim 1 wherein the source of electricity includes a battery and a microcontroller that produces a pulse width modulated alternating current.

6. The split flux transformer of claim 5 further comprising:
   an input current sensor connected to measure input current at the input coil;
   an output current sensor connected to measure output current of the electrical energy delivered to the output circuit.

7. The split flux transformer of claim 6 wherein power delivered to the input coil is varied by the microcontroller based on the measured input current and the measured output current.

8. The split flux transformer of claim 7 wherein the microcontroller varies input power by varying the pulse width modulation.

9. The split flux transformer of claim 6 further comprising a human-interface device including a keyboard and a display communicatively connected to the microcontroller.

10. The split flux transformer of claim 9 further comprising a computer with a memory, and wherein the measured output current and the measured input current are stored as data in the memory.

11. The split flux transformer of claim 1 wherein the input coil, the first output coil, and the second output coil are arranged along separate portions of a triangle.

12. The split flux transformer of claim 1 wherein the first output coil, and the second output coil are bifilar coils.

13. The split flux transformer of claim 1 wherein the first flow of current and the second flow of current are substantially equal.

14. The split flux transformer of claim 1 wherein the first output coil and the second output coil have the same number of turns.

15. The split flux transformer of claim 14 wherein the input coil has at least twice as many turns as the first output coil.

16. The split flux transformer of claim 1 wherein the third magnetic core includes an amorphous metal alloy.

* * * * *